(12) United States Patent
Riemann (10) Patent No.: US 10,562,099 B2
(45) Date of Patent: Feb. 18, 2020

(54) GRADIENT MATERIAL CONTROL AND PROGRAMMING OF ADDITIVE MANUFACTURING PROCESSES

(71) Applicant: FORMALLOY, LLC, Spring Valley, CA (US)

(72) Inventor: Jeffrey L. Riemann, Spring Valley, CA (US)

(73) Assignee: FORMALLOY, LLC, Spring Valley, CA (US)

(*) Notice: Subject to any disclaimer, the term of this patent is extended or adjusted under 35 U.S.C. 154(b) by 9 days.

(21) Appl. No.: 16/058,854

(22) Filed: Aug. 8, 2018

(65) Prior Publication Data
US 2019/0047048 A1 Feb. 14, 2019

Related U.S. Application Data

(60) Provisional application No. 62/543,591, filed on Aug. 10, 2017.

(51) Int. Cl.
| | | |
|---|---|---|
| *B22F 3/105* | (2006.01) | |
| *B33Y 50/02* | (2015.01) | |
| *B23K 26/342* | (2014.01) | |
| *G05B 19/4099* | (2006.01) | |
| *B23K 26/00* | (2014.01) | |
| *B33Y 10/00* | (2015.01) | |
| *B33Y 30/00* | (2015.01) | |

(52) U.S. Cl.
CPC ........ *B22F 3/1055* (2013.01); *B23K 26/0093* (2013.01); *B23K 26/342* (2015.10); *B33Y 50/02* (2014.12); *G05B 19/4099* (2013.01); *B22F 2003/1057* (2013.01); *B33Y 10/00* (2014.12); *B33Y 30/00* (2014.12); *G05B 2219/35134* (2013.01); *G05B 2219/45164* (2013.01); *G05B 2219/49007* (2013.01)

(58) Field of Classification Search
None
See application file for complete search history.

(56) References Cited

U.S. PATENT DOCUMENTS

| | | | | |
|---|---|---|---|---|
| 10,228,666 | B2* | 3/2019 | Livingston | G05B 15/02 |
| 2013/0029032 | A1* | 1/2013 | King | B01L 3/0268 |
| | | | | 427/96.7 |
| 2014/0070461 | A1* | 3/2014 | Pax | B33Y 50/02 |
| | | | | 264/401 |
| 2017/0248937 | A1* | 8/2017 | Guimbretiere | G05B 19/4099 |

* cited by examiner

*Primary Examiner* — Ryan A Jarrett
(74) *Attorney, Agent, or Firm* — Patterson + Sheridan, LLP (57) ABSTRACT

Aspects of the present disclosure relate to. In one example, a method of controlling an additive manufacturing machine includes: determining a material transition between a first machine control code and a second machine control code in a set of machine control codes; determining a material transition time for the determined material transition between the first machine control code and the second machine control code; determining a motion time from the first machine control code and the second machine control code; comparing the material transition time to the motion time; and manipulating the set of machine control codes based on the comparison.

20 Claims, 5 Drawing Sheets

| | 202 | 204 | | | | 206 | | | |
|---|---|---|---|---|---|---|---|---|---|
| | INDEX 1 | MOTION PARAMATER 1 | MOTION PARAMATER 2 | MOTION PARAMATER ... | MOTION PARAMATER m | STATE PARAMETER 1 | STATE PARAMETER 2 | STATE PARAMETER ... | STATE PARAMETER n |
| | INDEX 2 | MOTION PARAMATER 1 | MOTION PARAMATER 2 | MOTION PARAMATER ... | MOTION PARAMATER m | STATE PARAMETER 1 | STATE PARAMETER 2 | STATE PARAMETER ... | STATE PARAMETER n |

| | 232 | 234 | | | | 238 | 236 | | |
|---|---|---|---|---|---|---|---|---|---|
| | INDEX 1 | MOTION PARAMATER 1 | MOTION PARAMATER 2 | MOTION PARAMATER ... | MOTION PARAMATER m | STATE PARAMETER 1 | STATE PARAMETER 2 | STATE PARAMETER ... | STATE PARAMETER n |
| | *INDEX 1.5* | *MOTION PARAMATER 1* | *MOTION PARAMATER 2* | *MOTION PARAMATER ...* | *MOTION PARAMATER m* | *STATE PARAMETER 1* | *STATE PARAMETER 2* | *STATE PARAMETER ...* | *STATE PARAMETER n* |
| | INDEX 2 | MOTION PARAMATER 1 | MOTION PARAMATER 2 | MOTION PARAMATER ... | MOTION PARAMATER m | STATE PARAMETER 1 | STATE PARAMETER 2 | STATE PARAMETER ... | STATE PARAMETER n |

| | 262 | 264 | | | | 268 | 266 | | |
|---|---|---|---|---|---|---|---|---|---|
| | INDEX 1 | MOTION PARAMATER 1 | MOTION PARAMATER 2 | MOTION PARAMATER ... | MOTION PARAMATER m | *STATE PARAMETER 1'* | *STATE PARAMETER 2'* | STATE PARAMETER ... | STATE PARAMETER n |
| | INDEX 2 | MOTION PARAMATER 1 | MOTION PARAMATER 2 | MOTION PARAMATER ... | MOTION PARAMATER m | STATE PARAMETER 1 | STATE PARAMETER 2 | STATE PARAMETER ... | STATE PARAMETER n |

GRADIENT MATERIAL CONTROL AND PROGRAMMING OF ADDITIVE MANUFACTURING PROCESSES

CROSS-REFERENCE TO RELATED APPLICATION

This application claims the benefit of U.S. Provisional Patent Application No. 62/543,591, filed on Aug. 10, 2017, the disclosure of which is incorporated herein by reference in its entirety.

INTRODUCTION

The present disclosure relates to additive manufacturing systems and methods. In particular, aspects of the present disclosure relate to systems and methods for creating multi-material and gradient-material structures and coatings using an additive manufacturing system, such as a laser metal deposition system.

Examples of commercially available additive manufacturing methods include extrusion-based methods (e.g., Fused Deposition Modeling (FDM)), fusing or binding from a powder bed based methods (e.g., Selective Laser Sintering (SLS), Selective laser melting (SLM), and Electron beam melting (EBM)), lamination methods, photopolymerization methods (e.g., stereo lithography), powder- or wire-fed directed energy deposition methods (e.g., direct metal deposition (DMD), laser additive manufacturing (LAM), laser metal deposition (LMD)), and others.

Laser metal deposition (LMD) is a laser-based additive manufacturing process in which metal structures are built up on a substrate or metal layers and structures are applied to existing components (e.g., cladding) in layers. In LMD, a laser generates a molten bath on an existing surface into which metal powder is directed through a nozzle in a deposition head (e.g., using a carrier gas). The powder melts and bonds with the base material in the molten pool thereby forming new layers and ultimately structures additively.

Additive manufacturing methods, such as LMD, provide unique capabilities to create multi-material and gradient-material structures and coatings. Gradient materials are a special type of multi-material structure wherein the material composition is a blend of two or more different materials. For example, a structure may be manufactured to have a first layer comprising 100% steel and 0% copper, a second layer comprising 50% steel and 50% copper, and a third layer comprising 0% steel and 100% copper. Gradient materials may provide various advantages versus a discreet changeover in materials, such as: reduced stress at the multi-material fusion line, which helps to avoid delamination and cracking. However, existing methods for programming and controlling an additive manufacturing system to create multi-material and gradient-material structures are ineffective, especially if the material gradient varies nonlinearly throughout the structure. Using LMD as an example, if a substantial transport distance exists between a material (e.g., powder) feeder and a deposition head of an LMD system, a programmed change in the actual material output of the feeder will lag the change in the material being deposited by the deposition head. In some cases, the delay may be as much as 0.5 to 20 seconds, depending upon the distance between the material feeder and deposition head, the type of material, the pressure and speed of the carrier gas, etc. The delay may result in deposition of the wrong materials, or the wrong proportion of materials, as compared to the modeled object being additively manufactured. Such issues may result in structural as well as aesthetic and functional deficiencies.

Accordingly, what is needed is an improved programming and control methodology for creating gradient-material structures using additive manufacturing methods, such as LMD methods.

BRIEF SUMMARY

Certain embodiments provide a method of controlling an additive manufacturing machine, including: determining a material transition between a first machine control code and a second machine control code in a set of machine control codes; determining a material transition time for the determined material transition between the first machine control code and the second machine control code; determining a motion time from the first machine control code and the second machine control code; comparing the material transition time to the motion time; and manipulating the set of machine control codes based on the comparison.

Other embodiments may provide an apparatus configured to perform a method of controlling an additive manufacturing machine, or a computer-readable medium comprising instructions that when executed by a processor of an apparatus, cause the apparatus to perform a method of controlling an additive manufacturing machine.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide methods and apparatuses for creating multi-material and gradient-material structures and coatings using additive manufacturing methods, such as a laser metal deposition method.

Additive manufacturing systems, such as 3D printers, may be used to build three-dimensional parts from digital representations (e.g., models) of the parts. Initially, a 3D design model or representation may be created using appropriate modeling and design software. The files making up a 3D CAD model may include material property information or attributes. For example, files such as OBJ files or assemblies of STL files may include material property information. In some cases, each individual STL file may have its own material type. An analogous situation is the inclusion of color data within a CAD file, such as the information represented in an OBJ file type for multi-color 3D printing. Then, the 3D model may be converted into a series of layers using software, such as "slicing" software. Thereafter, each layer may be processed to create machine control codes for directing one or more elements of an additive manufacturing system along a specific path to create a particular layer. The machine control codes may be in the form of, for example, G-code tailored to a specific type of additive manufacturing machine.

In order to alleviate certain deficiencies in existing additive manufacturing methods, enhancements to existing machine control codes and methods for adapting such machine control codes either before or during processing are described herein. Further a method for implementing closed loop control of an additive manufacturing machine otherwise controlled by machine control codes is described herein.

Example Additive Manufacturing System

Figure 1:
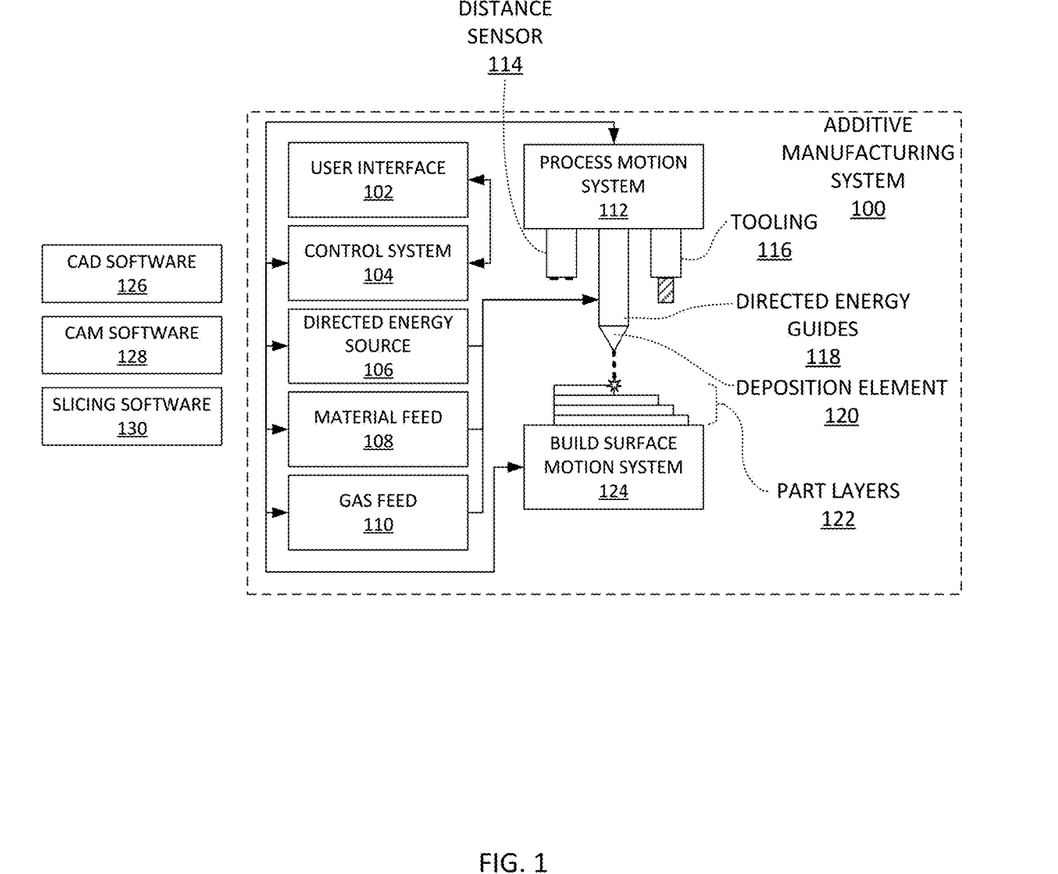
FIG. 1 depicts an example of an additive manufacturing system.

FIG. 1 depicts an example of an additive manufacturing system 100. Additive manufacturing system 100 includes a user interface 102. User interface 102 may be, for example, a graphical user interface comprising hardware and software controls for controlling additive manufacturing system 100. In some examples, user interface 102 may be integral with additive manufacturing system 100 while in other examples user interface 102 may be remote from additive manufacturing system 100 (e.g., on a remote computer such as a laptop computer or a personal electronic device).

Additive manufacturing system 100 also includes a control system 104. In this example, control system 104 is in data communication with user interface 102 as well as directed energy source 106, material feed 108, gas feed 110, distance sensor 114, process motion system 112, tooling 116, and build surface motion system 124. In other examples, control system 104 may be in data communication with further elements of additive manufacturing system 100.

Control system 104 may include hardware and software for controlling various aspects of additive manufacturing system 100. For example, control system 104 may include one or more: processors, memories, data storages, physical interfaces, software interfaces, software programs, firmwares, and other aspects in order to coordinate and control the various aspects of additive manufacturing system 100. In some examples, control system 104 may include network connectivity to various aspects of additive manufacturing system 100 as well as to external networks, such as the Internet and other networks, such as local area networks (LANs) and wide area networks (WANs). In some examples, control system 104 may be a purpose-built logic board, while in other examples control system 104 may be implemented by a general purpose computer with specific software components for controlling the various aspects of additive manufacturing system 100. The data connections shown between control system 104 and other aspects of additive manufacturing system 100 are exemplary only, and other implementations are possible.

Control system 104 may interpret commands received from user interface 102 and thereafter cause appropriate control signals to be transmitted to other aspects of additive manufacturing system 100. For example, a user may input data representing a part to be processed using additive manufacturing system 100 into user interface 102 and control system 104 may act upon that input to cause additive manufacturing system 100 to process the part.

In some examples, control system 104 may compile and execute machine control codes, such as G-code data, that causes aspects of additive manufacturing machine 100 to operate. For example, the machine control codes may cause process motion system 112 or build surface motion system 124 to move to specific positions and at specific speeds. As another example, the machine control codes may cause directed energy source 106, material feed 108, gas feed 110, or tooling 116 to activate or deactivate. Further, the machine control codes may modulate the operation of the aforementioned aspects of additive manufacturing machine 100, such as by increasing or decreasing the power of directed energy source 106, increasing or decreasing the flow rate of material feed 108 or gas feed 110, increasing or decreasing the speed of tooling 116, etc.

Process motion system 112 may move elements of additive manufacturing system 100 to exact positions. For example, process motion system 112 may position deposition element 120 at an exact distance from a part layer 122 being manufactured. Similarly, process motion system 112 may position tooling 116 precisely to perform fine tooling operations on a part layer 122. Further, process motion system 112 may position distance sensor 114 precisely and provide a known reference location for distance measurements to one or more points on a part layer 122. Process motion system 112 may also report current positioning of elements of additive manufacturing system 100 to control system 104 for use in providing feedback during the additive manufacturing process.

Directed energy source 106 may provide any suitable form of directed energy, such as a laser beam (e.g., from a fiber laser) or an electron beam generator, which is capable of melting a manufacturing material, such as a metal powder. Directed energy source 106 may interact with directed energy guides 118 in order to, for example, direct or focus a particular type of directed energy. For example, directed energy guides 118 may comprise one or more optical elements, such as mirrors, lenses, filters, and the like, configured to focus a laser beam at a specific focal point and to control the size of the focused laser point. In this way, the actual creation of the laser energy by directed energy source 106 may be located remote from the manipulation and focus of the laser energy by directed energy guides 118.

Directed energy source 106 may also be used to remove material from a manufactured part, such as by ablation.

Material feed 108 may supply building material, such as a powder, to deposition element 120. In some examples, material feed 108 may be a remote reservoir including one or more types of raw material (e.g., different types of metal) to be used by additive manufacturing system 100.

Deposition element 120 may be connected with material feed 108 and may direct material, such as powder, towards a focal point of directed energy source 106. In this way, deposition element 120 may control the amount of material that is additively manufactured at a particular point in time. Deposition element may include nozzles, apertures, and other features for directing material, such as metal powder, towards a manufacturing surface, such as a build surface or previously deposited material layer. In some examples, deposition element 120 may have controllable characteristics, such as controllable nozzle aperture sizes. In some examples, deposition element 120 may be a nozzle assembly or deposition head of a laser metal deposition machine.

Gas feed 110 may be connected with deposition element 120 to provide propulsive force to the material provided by material feed 108. In some examples, gas feed 110 may modulate the gas flow rate to control material (e.g., powder) flow through deposition element 120 and/or to provide cooling effect during the manufacturing process.

Distance sensor 114 may be any sort of sensor capable of measuring distance to an object. In some examples, distance sensor 114 may be an optical distance sensor, such as a laser distance sensor. In other examples, distance sensor 114 may be an acoustic distance sensor, such as an ultrasonic sensor. In yet other examples, distance sensor 114 may be an electromagnetic distance sensor or a contact-based distance sensor.

Tooling 116 may be any form of machine tool, such as a tool for cutting, grinding, milling, lathing, etc. In the example depicted in FIG. 1, Tooling 116 may be moved into place by process motion system 112. In other examples, tooling 116 may be separate from, for example, deposition element 120 and distance sensor 114 but likewise controllable by control system 104.

Notably, while directed energy source 106, material feed 108, gas feed 110, directed energy guides 118, distance sensor 114, tooling 116, and deposition element 120 are shown in an example configuration in FIG. 1, other configurations are possible.

Process motion system 112 may control the positioning of one or more aspects of additive manufacturing system 100, such as distance sensor 114, deposition element 120, and tooling 116. In some examples, process motion system 112 may be movable in one or more degrees of freedom. For example, process motion system 112 may move and rotate deposition element 120, distance sensor 114, and tooling 116 in and about the X, Y, and Z axes during the manufacturing of part layers 122.

Build surface motion system 124 may control the positioning of, for example, a build surface upon which part layers 122 are manufactured. In some examples, build surface motion system 124 may be movable in one or more degrees of freedom. For example, build surface motion system 124 may move and rotate the build surface in and about the X, Y, and Z axes during the manufacturing of part layers 122. In some examples, the build surface may be referred to as a build plate or build substrate.

Computer-Aided Design (CAD) software 126 may be used to design a digital representation of a part to be manufactured, such as a 3D model. CAD software 126 may be used to create 3D design models in standard data formats, such as DXF, STP, IGS, STL, and others. While shown separate from additive manufacturing system 100 in FIG. 1, in some examples CAD software 126 may be integrated with additive manufacturing system 100.

Slicing software 130 may be used to "slice" a 3D design model into a plurality of slices or design layers. Such slices or design layers may be used for the layer-by-layer additive manufacturing of parts using, for example, additive manufacturing system 100.

Computer-Aided Manufacturing (CAM) software 128 may be used to create machine control codes, for example, G-Code or LAMPS codes as described further below, tp control additive manufacturing machine 100. For example, CAM software may create code in order to direct a manufacturing system, such as additive manufacturing system 100, to deposit a material layer along a 2D plane, such as a build surface, in order to build a part. For example, as shown in FIG. 1, part layers 122 are manufactured on (e.g., deposited on, formed on, etc.) build surface motion system 124 using process motion system 112 and deposition element 120.

In some examples, one or more of CAD software 126, CAM software 128, and Slicing Software 130 may be combined into a single piece or suite of software. For example, CAD or CAM software may have an integrated slicing function.

Example Coding Methodology for Control of Laser Metal Deposition (LMD) Machine

As described above, an additive manufacturing system, such as system 100 of FIG. 1, is generally configured to be controlled by machine control codes, which directs the system to deposit material in a desired location in order to build the desired structure.

Traditional machine control codes, such as G-codes, for controlling an additive manufacturing system, such as a Laser Metal Deposition (LMD) machine, may be in a format such as: "LINEAR X10 Y0 Z0 F50". In this example, the variables used in the machine control code have the following meanings: (1) LINEAR: type of motion command, with other possible commands, such as ARC or CIRCLE; (2) X: location in the Cartesian X-axis of the LMD machine in units, such as millimeters; (3) Y: location in the Cartesian Y-axis of the LMD machine in units, such as millimeters; (4) Z: location in the Cartesian Z-axis of the Laser Metal Deposition machine in units, such as millimeters; and (5) F: motion scan rate of the LMD machine in units, such as millimeters per second. Thus, traditional machine control codes focus only on motion of aspects of the additive manufacturing machine. Notably, the aforementioned units (e.g., millimeters) are just one example, and other examples of absolute and relative distance measures are possible. Similarly, the coordinate system need not be a Cartesian coordinate system, and other coordinate systems now known, such as cylindrical, spherical, polar, curvilinear, and later developed may be used. Further, due to the various implementations of G-code, generic forms of commands such as LINEAR, ARC and CIRCLE are used herein instead of G01, G02, G03, and others. However, G-code is one means of programming systems described herein.

Extending the conventional machine control code format to include state variables (or parameters) in addition to conventional motion commands enables improved control of additive manufacturing machines, such as laser metal deposition (LMD) machines, so that multi-material and gradient-material structures may be created. The improved coding methodology may be referred to as a Location and Material Process State (LAMPS) coding.

The following is an example of machine control codes using an example LAMPS format, which extends the number of variables included in each code:

```
LINEAR X0 Y0 Z0 F50 P1000 M100 N0
LINEAR X10 Y0 Z0 F50 P750 M50 N50
LINEAR X20 Y0 Z0 F50 P1000 M100 N0
```

The additional variables (or parameters) in this example of the LAMPS codes (as compared to the example above) are: (1) P: laser power of the LIVID machine in units, such as Watts; (2) M: first material mass rate in units, such as grams per minute; and (3) N: second material mass rate in units, such as grams per minute. Notably, the aforementioned additional variables are exemplary, and many other state variables may be used. For example, carrier gas flow, shield gas flow, active cooling on/off, powder hopper mixer on/off, and others. Further, the units are also exemplary and other units may be substituted. For example, any chosen unit may be converted to percentages of maximum value or other values depending upon a machine operator's preference.

Thus, the LAMPS coding format enables an additive manufacturing machine, such as a LMD machine, to combine traditional motion commands in machine control code, such as "LINEAR X10 Y0 Z0 F50", with additional state variables, such as laser power, first material mass rate, and second material mass rate, and so on. The use of such state variable alongside traditional motion commands enables an operator to vary additional aspects of the additive manufacturing machine, such as the laser power and material types being deposited, at any location within a structure in order to create multi-material and gradient material structures.

Figure 2A:
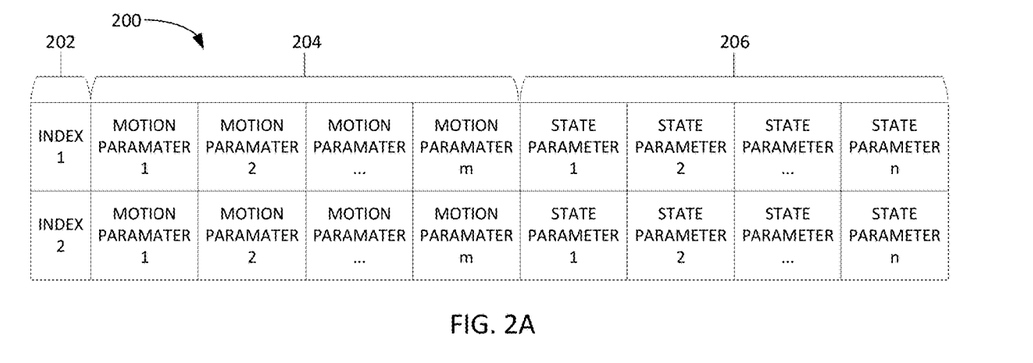
FIGS. 2A-2C depict examples of Location and Material Process State (LAMPS) codes.

FIG. 2A depicts an example of a set of LAMPS codes 200. In this example, each individual LAMPS code in the set 200 is indexed by a unique index number 202. Further, each individual LAMPS code includes motion parameters 204. For example, as described above, the motion parameters 204 may include a type of motion (e.g., linear) as well as coordinate parameters for a given coordinate system, such as X, Y, and Z coordinates in a Cartesian coordinate system. Further, motion parameters 204 may include, for example, a scan rate of a laser metal deposition head, or a movement command for a movable build platform, such as build surface motion system 124 in FIG. 1.

LAMPS codes 200 further include state parameters 206. The state parameters 206 may refer to, for example, specific states of the laser metal deposition machine, such as laser power, material flow rates (e.g., mass flow rates of powders), gas flow rates (e.g., carrier gas, shield gas, cooling gas, etc.), discreet states such as active cooling on/off and powder hopper mixer on/off, and others.

Notably, the format of the LAMPS codes 200 in FIG. 2A are exemplary only. More or fewer individual parameters may be present in different implementations of the LAMPS format. Further, different orders of the parameters are possible without affecting the purpose of providing the additional state parameters. Further yet, in some examples, each LAMPS code may include a different number of parameters as relevant to the particular instruction. For example, an individual LAMPS code at a particular index may only include state parameters when no movement is necessary in a given step. Similarly, a subset of motion parameters may be included depending on the type of motion being commanded by the LAMPS codes. The format of the LAMPS codes is flexible. In order to be able to interpret LAMPS codes when there is not a fixed number of parameters, prefixes may be used (as in the example above) before individual parameters so that the additive manufacturing machine can interpret the parameters present in any given LAMPS code.

Example Method for Machine Code Manipulation to Address Material Transport Delay The benefits of LAMPS coding for control of additive manufacturing machines, such as LMD machines, may be further extended by accounting for material transport delays in the additive manufacturing machine. For example, the material delay from a material feeder to a deposition element (such as deposition element 120 in FIG. 1). Because the time for material flow at the deposition element to change and stabilize may be predictable and repeatable, machine control codes (e.g., LAMPS) can be adjusted to account for the material transition time. Accounting for this transition time ensures that the proper material states are reached before depositing material at the build site.

In some embodiments, a code manipulation module (e.g., a module of control system 104 in FIG. 1) computes the time required to complete motion commands as discussed above (e.g., in conventional or LAMPS machine control codes) and monitors the changes in material parameters that are defined in the machine control codes.

In some examples, the computation of the motion time is determined based on several factors. For example, in the context of a LIVID machine, the factors may include: the distance travelled by a deposition head, the scan rate of the deposition head, and acceleration profile of the deposition head. Further, where an additive manufacturing machine includes a movable build platform (e.g., build surface motion system 124 in FIG. 1), the motion of the build platform may be further factored into the motion time because the deposition head and build platform may be moving simultaneously and thereby affect a relative motion rate.

The code manipulation module may compare a calculated motion time to the material transport time and add or modify lines of machine control code so as to ensure the material mass rate is at the desired amount when the deposition head reaches the designated location. For example, machine motion delays may be added to the machine control code by the code manipulation module if the material mass rate is determined to not be achievable within a given time period, or at the beginning of a machine control code to allow material flow to initiate.

Figure 3:
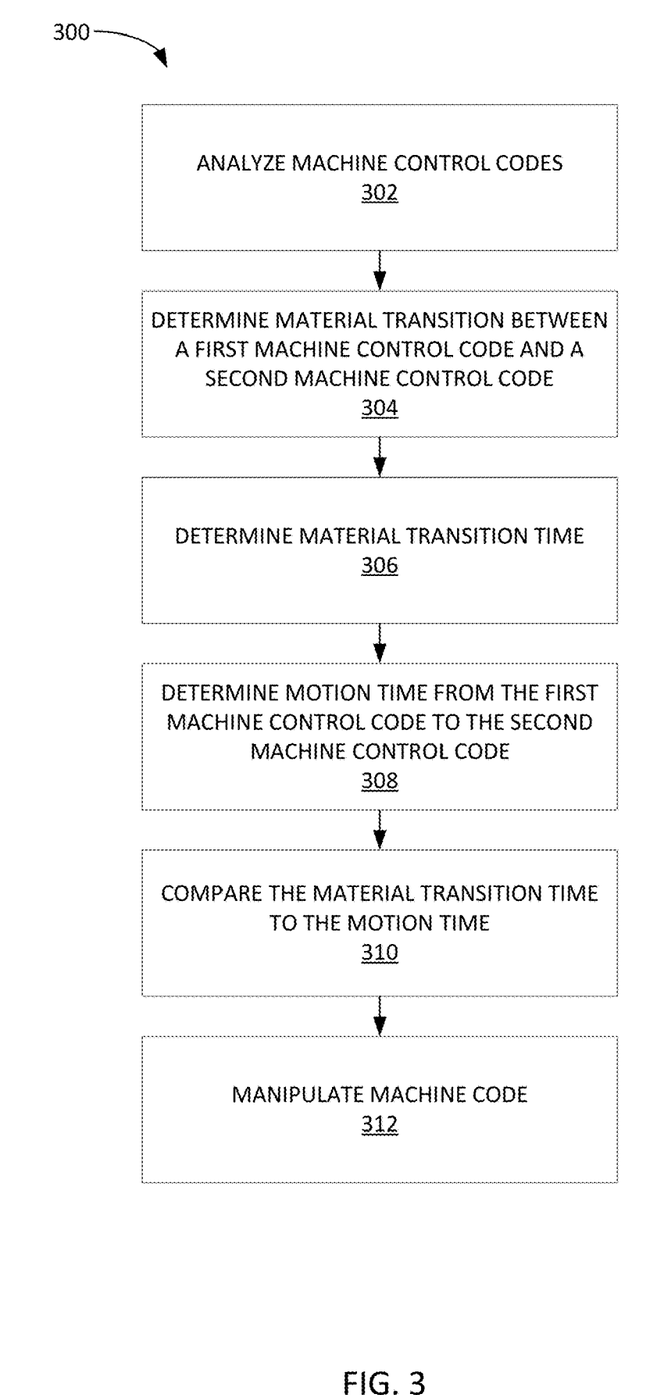
FIG. 3 depicts a method for manipulating machine control code to account for material transportation delays.

FIG. 3 depicts a method 300 for manipulating machine control codes to account for material transportation delays.

Method 300 begins at step 302 with analyzing machine control codes. For example, the machine control codes could be LAMPS codes as described and depicted above with respect to FIG. 2A. The machine control codes may be received by control system 104 of FIG. 1 and a code manipulation module of control system 104 may analyze the machine control codes.

Method 300 then proceeds to step 304 with determining a material transition between a first machine control code and a second machine control code. For example, a transition may be between one material and a second material, or between one ratio of two or more materials, to another ratio of two or more materials. A material transition may be defined in a LAMPS code, as discussed above with respect to FIG. 2A. The inclusion of state parameters in the LAMPS codes significantly eases the determination of material transitions.

The material transition may be associated with a future process position, which is any position that a processing portion of an additive manufacturing machine, such as deposition element 120 of FIG. 1, is not currently in. For example, when examining machine control code from a starting position (e.g., before any processing begins), the future process positions are any positions to which the machine has to move during the processing according to the machine control codes. When examining machine control codes during processing (e.g., looking ahead from the current code entry), future process positions may be any position in future machine control codes.

Method 300 then proceeds to step 306 with determining a material transition time. The material transition time is a measure of how long it will take the additive manufacturing machine to transition from a first material composition to a second material composition, where each composition may include one or more materials.

In some examples, the material transition times may be based on several factors, such as type of material, material flow rate, gas flow rates (e.g., carrier gas flow rates), type of deposition equipment (e.g., type of nozzle), etc.

In some cases, the material transition times may be experimentally determined initially and then stored in a look-up table, or other data storage element, and accessible to a control system, such as control system 104 in FIG. 1. For example, the look-up table may be stored in the form of a database accessible to the control system, or the look-up table may be stored in a local memory accessible to the control system. In some examples, the look-up table may be rules-based.

Method 300 then proceeds to step 308 with determining a motion time from the first machine control code to the second machine control code. The motion time is a measure of the length of time it takes to move a processing portion of an additive manufacturing machine, such as deposition element 120 of FIG. 1, from one position, such as a current position, to another position, such as a future position, as defined in the machine control codes. For example, the first position may be set by motion parameters in a first LAMPS code and the second position may be set by motion parameters in a second LAMPS code (such as described with respect to FIG. 2A, above).

In some cases, such as where the machine control code is at its start, the current process position may be an initialization or starting position for the additive manufacturing machine. In other cases, such as where the additive manufacturing machine is actively processing material, the current process position is the current position of, for example, a deposition element.

The determination of the motion time may be based on many parameters, such as a maximum or set movement or scan rate of a deposition element (such as by process motion system 112 of FIG. 1), a maximum or set movement rate of an underlying build platform (such as build surface motion system 124 of FIG. 1), the distance between the current process position and the future process position, the acceleration characteristics of the deposition head and/or the build platform, etc. As above, there may be a difference between a maximum movement rate and a set movement rate, such as when a deposition head is moving without processing underlying material, and when it is moving while processing underlying material.

Method 300 then proceeds to step 310 with comparing the material transition time to the motion transition time. If the material transition time is greater than the motion transition time, then method 300 proceeds to step 312 where the code manipulation module of the additive manufacturing machine control system manipulates the machine control code to prevent the machine motion from overrunning the material transition. For example, the code manipulation module may add a machine control code to the existing set of machine control codes to create additional time for the material to transition.

Notably, while FIG. 3 is described with respect to a code manipulation module of a machine control system, such as control system 104 of FIG. 1, the method described herein can be implemented in other modules, including standalone modules or control systems of an additive manufacturing machine.

An advantage of method 300 is that it does not require changing any underlying control logic of the additive manufacturing machine. In other words, because the codes are being manipulated, rather than the machine directly, method 300 should be widely applicable to existing machines without significant redesign of the underlying operation and control systems.

Referring back to FIG. 2B, an example of manipulating a set of machine control codes 230 is depicted, which may be implemented in embodiments of method 300, described above. In this example, assume that a material transition is determined between "Index 1" and "Index 2", such as described in FIG. 3 with respect to step 304. In order to account for the material transition, the machine control codes 230 are manipulated (e.g., in step 312 of FIG. 3) by adding (i.e., interleaving) a new machine control code at "Index 1.5" as indicated by box 238. For example, the new machine control code may be added by the code manipulation module of the additive manufacturing machine control system. The newly added machine control code may include all or a subset of parameters of other machine control codes in the set of machine control codes 230, such as motion parameters 234 and state parameters 236. In this example, the newly added machine control code at "Index 1.5" may cause the additive manufacturing machine to delay, move more slowly, turn off the laser, change gas flow rates, or affect any other sort of motion or state parameter in order to ensure that the material transition time is met or exceeded before starting to process according to the machine control code at "Index 2".

Figure 2B:
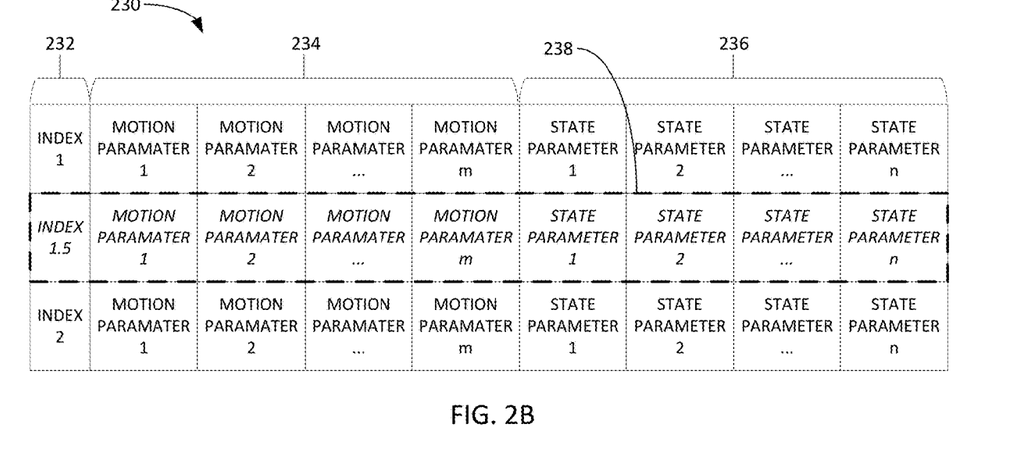

In the example depicted in FIG. 2B, the newly added machine control code at "Index 1.5" is given an index number that is between the preceding and succeeding machine control codes, with indexes 1 and 2 respectively. In other examples, the code manipulation module may add a new machine control code and simply renumber all of the indexes. Further, in other examples the newly added machine code may be before Index 1 (e.g., at "Index 0.5" instead).

Figure 2C:
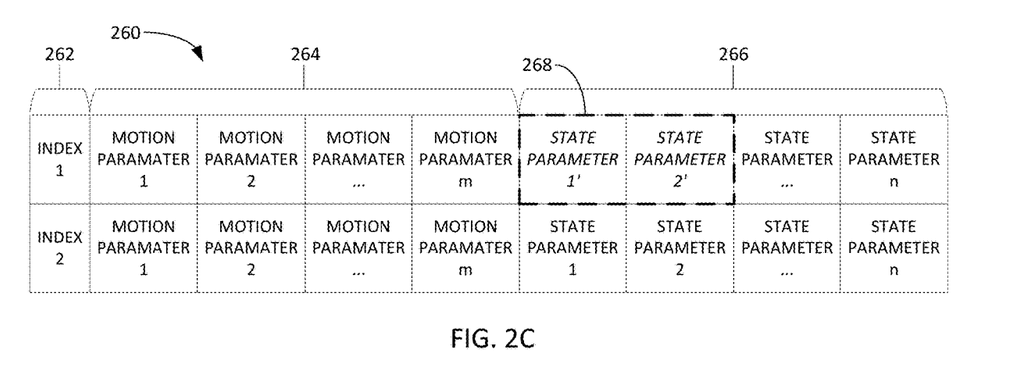

FIG. 2C depicts another example of manipulating a set of machine codes 260, which include indexes 262, motion parameters 264, and state parameters 266, like in FIG. 2A. In this example, assume again that a material transition is determined between "Index 1" and "Index 2", such as described in FIG. 3 with respect to step 304. In FIG. 2C, specific parameters of an existing machine code (in this example, at "Index 1") are manipulated (e.g., in step 312 of FIG. 3), as depicted by the box at 268, instead of adding new machine control codes, such as described with respect to FIG. 2B. In other words, the code manipulation module may manipulate one or more previous machine control codes before a machine control code comprising a material transition (e.g., in state parameters 266 of "Index 2") in order to front-run the material transition. In other words, the concept depicted in FIG. 2C leverages the material transition time by modifying pre-existing machine control to start the transition early (e.g., at "Index 1") in order that the transition will have occurred by the time the new material composition is needed (e.g., at "Index 2"). In this example, the earlier machine control codes are modified so that the change in material composition arrives "just in time" for the machine control code commanding the change (e.g., here at "Index 2".

The different forms of manipulation depicted and described in FIGS. 2B and 2C may be combined. For example, a new machine control code may be added prior to an existing machine control code where a material transition is identified, as described with respect to 2B. And existing machine control codes may be further modified, as described with respect to 2C. In many cases, the relative amount of time necessary to make the material transition may dictate the preferred solution between the concepts described in FIGS. 2B and 2C, or some combination thereof.

In some examples, the code manipulation module may perform an analysis on the received machine control codes before ever beginning processing, and make changes to the machine control code based on the analysis of motion times and material transition times. In other examples, the code manipulation module may perform the analysis "on the fly" as the additive manufacturing machine is processing and may make dynamic adjustments to the machine control codes. For example, the code manipulation module may include a standard "look ahead" of some fixed number of machine control codes to determine whether any manipulation of the existing machine control codes is necessary.

Figure 4:
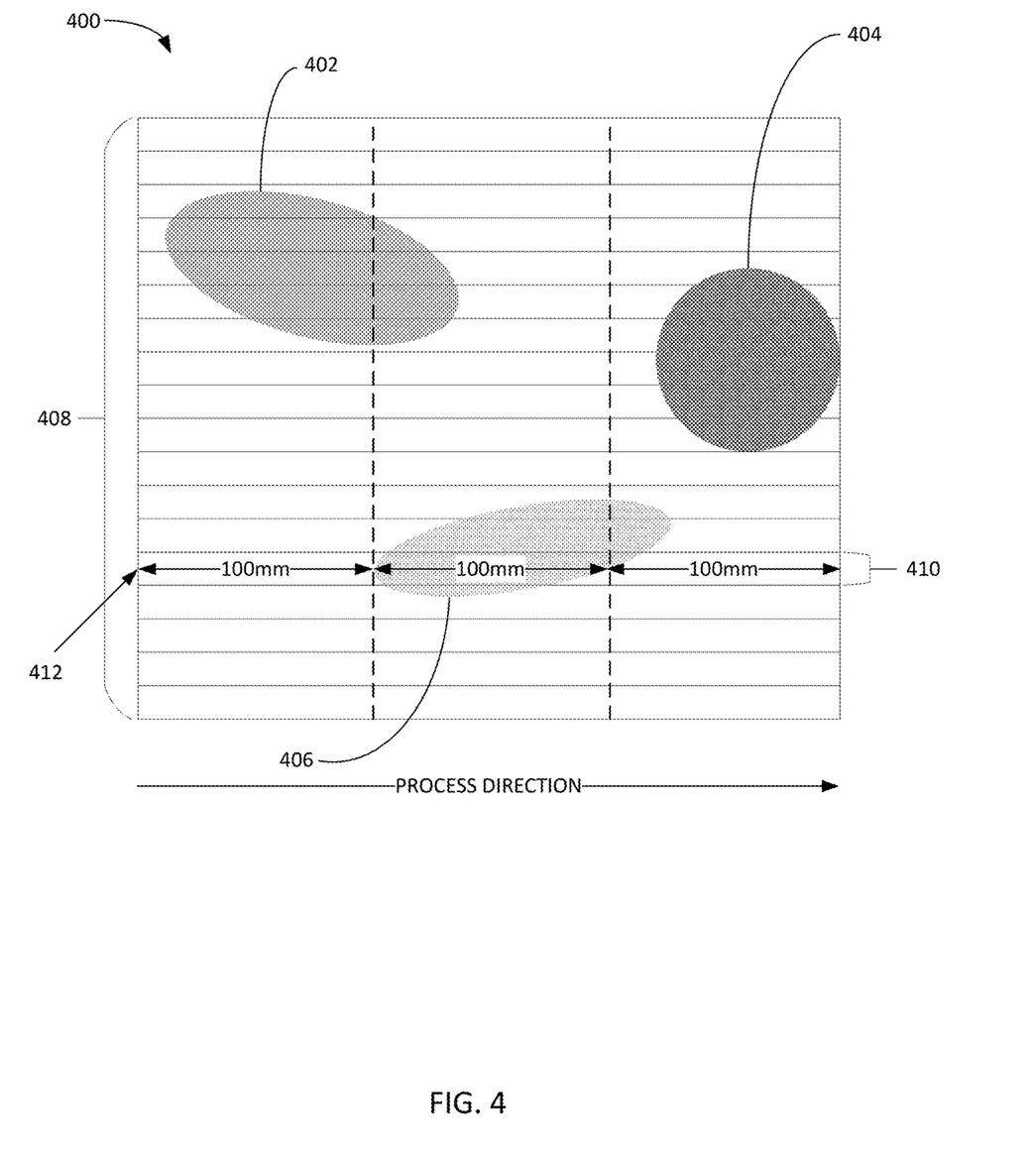
FIG. 4 depicts an example of a part that includes multiple material and gradient material structures.

FIG. 4 depicts an example of a part 400 that includes multiple material structures 402, 404, and 406. In this example, structure 402 in this example is a composition of 50% of a first material and 50% of a second material. Structure 404 is a composition of 25% of the first material and 75% of the second material. Structure 406 is a composition of 75% of the first material and 25% of the second material. The remaining portions of layers 408 are 100% of the first material.

Part 400 may be additively manufactured by an additive manufacturing system 100, such as described with respect to FIG. 1, according to a method, such as described with respect to FIG. 3. In a first example, a set of time-independent LAMPS codes corresponds to the layer 410 depicted in FIG. 4, and are as follows:

1. M100 N0 // Begins material 1 mass rate at 100%
2. DELAY 1 // Delay 1 second to allow material 1 mass rate to be achieved at deposition head
3. LASER ON // Turns on processing laser
4. LINEAR X100 Y0 Z0 F5 P1000 M100 N0 // Move 100 mm in the X direction at 5 mm/sec, 1000 W laser power, 100% material 1 mass rate, 0% material 2 mass rate, where time to complete the motion is 20 seconds
5. LINEAR X100 Y0 Z0 F5 P1000 M75 N25 // Move 100 mm in the X direction at 5 mm/sec, 1000 W laser power, 75% material 1 mass rate, 25% material 2 mass rate, where time to complete the motion is 20 seconds
6. LINEAR X120 Y0 Z0 F5 P1000 M100 N0 // Move 100 mm in the X direction at 5 mm/sec, 1000 W laser power, 100% material 1 mass rate, 0% material 2 mass rate, where time to complete the motion is 20 seconds
7. LASER OFF // Turns off processing laser In the preceding machine code example, there is no code manipulation, and so the gradient structure 406 will not have the desired composition at the desired location due to the time it takes for the material composition to change between, for example, step 4 (M100) and step 5 (M75 N25). This is because of the inherent delay in getting the material from a material feeder (e.g., material feed 108 of FIG. 1) to a processing component of the additive manufacturing machine (e.g., deposition element 120 of FIG. 1). The machine control codes will take approximately 61 seconds to complete, not accounting for acceleration of the machine motion system.

In a second example, a set of LAMPS codes corresponding to the layer 410 are modified (e.g., by a code manipulation module) to include a plurality of delays, as follows:

1. M100 N0 // Begins material 1 mass rate at 100%
2. DELAY 1 // Delay 1 second to allow material 1 mass rate to be achieved at deposition head
3. LASER ON // Turns on processing laser
4. LINEAR X100 Y0 Z0 F5 P1000 M100 N0 // Move 100 mm in the X direction at 5 mm/sec, 1000 W laser power, 100% material 1 mass rate, 0% material 2 mass rate, where time to complete the motion is 20 seconds
5. LASER OFF // Turns off processing laser
6. M75 N25 // Changes material 1 mass rate to 75%, material 2 mass rate to 25%
7. DELAY 1 // Delay 1 second to allow material 1 and 2 mass rates to be achieved at deposition head
8. LASER ON // Turns on processing laser
9. LINEAR X100 Y0 Z0 F5 P1000 M75 N25 // Move 100 mm in the X direction at 5 mm/sec, 1000 W laser power, 75% material 1 mass rate, 25% material 2 mass rate, where time to complete the motion is 20 seconds
10. LASER OFF // Turns off processing laser
11. M100 N0 // Changes material 1 mass rate to 100%, material 2 mass rate to 0%
12. DELAY 1 // Delay 1 second to allow material 1 and 2 mass rates to be achieved at deposition head
13. LASER ON // Turns on processing laser
14. LINEAR X120 Y0 Z0 F5 P1000 M100 N0 // Move 100 mm in the X direction at 5 mm/sec, 1000 W laser power, 100% material 1 mass rate, 0% material 2 mass rate, where time to complete the motion is 20 seconds In the second example, steps 5-8 and 10-13 are added as compared to the first example. The steps may be added by a code manipulation module, as described above with respect to FIG. 3. In this second example, the 1 second delays mean that the code will take longer to complete than in the first example, above, but in this second example the desired composition at the desired location will be achieved because the added delays (e.g., at Step 7) allow for the new material composition to make it from a material feeder (e.g., material feed 108 of FIG. 1) to a processing component of the additive manufacturing machine (e.g., deposition element 120 of FIG. 1). The code for the second example will take 63 seconds to complete, not accounting for acceleration of the machine motion system.

In a third example, another set of LAMPS codes corresponding to the layer 410 are modified (e.g., by a code manipulation module) to include a plurality of material transition steps, such as steps 5 and 7:

1. M100 N0 // Begins material 1 mass rate at 100%
2. DELAY 1 // Delay 1 second to allow material 1 mass rate to be achieved at deposition head
3. LASER ON // Turns on processing laser
4. LINEAR X95 Y0 Z0 F5 P1000 M100 N0 // Move 95 mm in the X direction at 5 mm/sec, 1000 W laser power, 100% material 1 mass rate, 0% material 2 mass rate, where time to complete the motion is 19 seconds
5. LINEAR X5 Y0 Z0 F5 P1000 M75 N25 // Move 5 mm in the X direction at 5 mm/sec, 1000 W laser power, 75% material 1 mass rate, 25% material 2 mass rate, where time to complete the motion is 1 second
6. LINEAR X95 Y0 Z0 F5 P1000 M75 N25 // Move 95 mm in the X direction at 5 mm/sec, 1000 W laser power, 75% material 1 mass rate, 25% material 2 mass rate, where time to complete the motion is 19 seconds
7. LINEAR X5 Y0 Z0 F5 P1000 M100 N0 // Move 5 mm in the X direction at 5 mm/sec, 1000 W laser power, 100% material 1 mass rate, 0% material 2 mass rate, where time to complete the motion is 1 second
8. LINEAR X120 Y0 Z0 F5 P1000 M100 N0 // Move 100 mm in the X direction at 5 mm/sec, 1000 W laser power, 100% material 1 mass rate, 0% material 2 mass rate, where time to complete the motion is 20 seconds
9. LASER OFF // Turns off processing laser In the third example, steps 5 and 7 are added as compared to the first example. The steps may be added by a code manipulation module, as described above with respect to FIG. 3. In the third example, the transition between one material composition (e.g., M100 at Step 4) and another material composition (e.g. M75/N25 at Step 6) is initiated in an intermediate material transition step (e.g., Step 5), which allows for the material composition to change while the deposition element is still moving. In this way, the target material composition is reached by the time the deposition head reaches the corresponding point in the model. While it is possible that the intermediate material transition steps (e.g., Step 5 and Step 7) may create small zones of transitional composition (e.g., between M100 and M75/N25), the benefit of this particular example is not having to turn the laser on and off repeatedly, which may negatively affect processing time as well as process quality. Further, the machine control codes in the third example will take 61 seconds to complete, just like the first example, but with the added benefit of having correct material compositions within structure 406.

Figure 5:
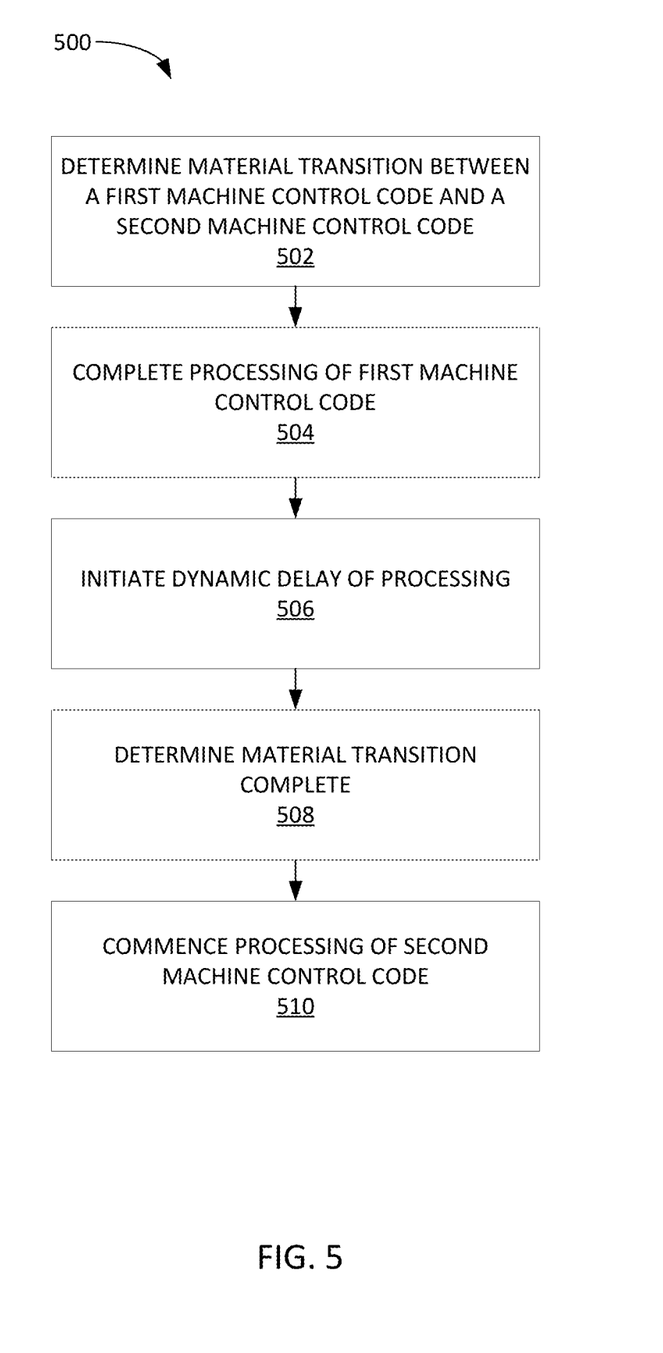
FIG. 5 depicts a method for addressing material transport delay using closed-loop process control of an additive manufacturing process.

Example Method for Addressing Material Transport Delay Using Closed-Loop Process Control of an Additive Manufacturing Machine FIG. 5 depicts a method 500 for addressing material transport delay using closed-loop process control of an additive manufacturing process.

Method 500 begins at step 502 with determining a material transition between a first machine control code and a second machine control code, in the same way as described above in FIG. 3 with respect to step 304.

Method 500 then proceeds to step 504 where the first machine control code is completed.

Method 500 then proceeds to step 506 with initiating a dynamic delay of processing while the material transitions from a first composition associated with the first machine control code to a second composition associated with the second machine control code. In this case, the dynamic delay does not require any changes to the initial machine control code. Rather, a delay is initiated between one machine control code and another automatically based on sensor feedback (e.g., from one or more material flow sensors).

Method 500 then proceeds to step 508 with determining that a material transition is complete. In this case, unlike method 300 described with respect to FIG. 3, the material composition is actively sensed at some point between a material feed and the processing component, such as deposition element 120 of FIG. 1. In some examples, the material composition is monitored at the processing component to give the most accurate condition of the material about to be processed. For example, sensors may be built into feed lines leading to a processing component, or even built within the processing component, such as within a LMD deposition head, to actively measure the material composition.

Once the material transition is determined to be complete at step 508, process 500 proceeds to step 510 with processing according the second machine control code.

An advantage of method 500 is minimizing any programmatic delay (e.g., delay added into machine control codes) that may overshoot the actual time necessary for the material to transition to a steady, desired state. As above, the delays may be based on experimental or predicted material transition times, which may not be accurate in all circumstances. Because many variables can affect the transition time between material compositions, active monitoring can provide a more direct and less inferential method for determining correct compositions.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of controlling an additive manufacturing machine, comprising:
   determining a material transition between a first machine control code and a second machine control code in a set of machine control codes;
   determining a material transition time for the determined material transition between the first machine control code and the second machine control code;

determining a motion time from the first machine control code and the second machine control code;

comparing the material transition time to the motion time; and manipulating the set of machine control codes based on the comparison.

2. The method of claim 1, wherein comparing the material transition time to the motion time includes determining that the material transition time is longer than the motion time.

3. The method of claim 2, wherein manipulating the machine control codes includes: adding a new machine control code before the second machine control code.

4. The method of claim 1, wherein manipulating the machine control codes includes: modifying an existing machine control code before the second machine control code.

5. The method of claim 1, wherein the first machine control code and the second machine control code each comprise at least one motion parameter and at least one state parameter.

6. The method of claim 1, further comprising: commencing additive manufacturing with an additive manufacturing machine according to the set of machine control codes.

7. The method of claim 6, wherein determining the material transition between the first machine control code and the second machine control code occurs before commencing additive manufacturing.

8. The method of claim 6, wherein the additive manufacturing machine is a laser metal deposition machine comprising a material feeder remote from a deposition element.

9. The method of claim 1, wherein the first machine control code includes at least a first state parameter associated with a first material and a second state parameter associated with a second material.

10. The method of claim 9, wherein:

the second machine control code includes at least a third state parameter associated with the first material and a fourth state parameter associated with the second material, the third state parameter is different than the first state parameter associated with the first machine control code, and the fourth state parameter is different than the second state parameter associated with the first machine control code.

11. An additive manufacturing machine, comprising:

a memory comprising computer-executable instructions; and a processor configured to execute the computer-executable instructions and cause the additive manufacturing machine to perform a method of controlling the additive manufacturing machine, the method comprising:

determining a material transition between a first machine control code and a second machine control code in a set of machine control codes;

determining a material transition time for the determined material transition between the first machine control code and the second machine control code;

determining a motion time from the first machine control code and the second machine control code;

comparing the material transition time to the motion time; and manipulating the set of machine control codes based on the comparison.

12. The additive manufacturing machine of claim 11, wherein comparing the material transition time to the motion time includes determining that the material transition time is longer than the motion time.

13. The additive manufacturing machine of claim 12, wherein manipulating the machine control codes includes: adding a new machine control code before the second machine control code.

14. The additive manufacturing machine of claim 11, wherein manipulating the machine control codes includes: modifying an existing machine control code before the second machine control code.

15. The additive manufacturing machine of claim 11, wherein the first machine control code and the second machine control code each comprise at least one motion parameter and at least one state parameter.

16. The additive manufacturing machine of claim 11, the method further comprising: commencing additive manufacturing with an additive manufacturing machine according to the set of machine control codes.

17. The additive manufacturing machine of claim 16, wherein determining the material transition between the first machine control code and the second machine control code occurs before commencing additive manufacturing.

18. The additive manufacturing machine of claim 16, wherein the additive manufacturing machine is a laser metal deposition machine comprising a material feeder remote from a deposition element.

19. The additive manufacturing machine of claim 11, wherein the first machine control code includes at least a first state parameter associated with a first material and a second state parameter associated with a second material.

20. The additive manufacturing machine of claim 19, wherein:

the second machine control code includes at least a third state parameter associated with the first material and a fourth state parameter associated with the second material, the third state parameter is different than the first state parameter associated with the first machine control code, and the fourth state parameter is different than the second state parameter associated with the first machine control code.

* * * * *